United States Patent
Schairer et al.

(10) Patent No.: US 7,826,750 B2
(45) Date of Patent: Nov. 2, 2010

(54) METHOD AND ARRANGEMENT FOR DEMODULATING AN OPTICAL DPSK BINARY SIGNAL

(75) Inventors: Wolfgang Schairer, Unterschleißheim (DE); Claus-Jörg Weiske, Fürstenfeldbruck (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 887 days.

(21) Appl. No.: 11/514,744

(22) Filed: Aug. 31, 2006

(65) Prior Publication Data

US 2007/0047967 A1    Mar. 1, 2007

(30) Foreign Application Priority Data

Aug. 31, 2005    (DE) .................. 10 2005 041 368

(51) Int. Cl.
    H04B 10/04    (2006.01)
(52) U.S. Cl. .................. 398/188; 398/185; 398/183; 398/182; 398/202
(58) Field of Classification Search .................. 398/188, 398/202, 203, 204, 183, 182, 185, 186, 140
    See application file for complete search history.

(56) References Cited

U.S. PATENT DOCUMENTS

| | | | | |
|---|---|---|---|---|
| 5,023,948 | A * | 6/1991 | Smith | 398/185 |
| 5,864,625 | A * | 1/1999 | Rutledge | 380/31 |
| 6,163,181 | A * | 12/2000 | Nishiyama | 327/115 |
| 6,201,632 | B1 | 3/2001 | Rollins | |
| 7,266,311 | B2 * | 9/2007 | Haunstein et al. | 398/209 |
| 7,273,091 | B2 * | 9/2007 | Bahl et al. | 165/121 |
| 2003/0198478 | A1 * | 10/2003 | Vrazel et al. | 398/183 |
| 2005/0069329 | A1 * | 3/2005 | Giles et al. | 398/188 |
| 2005/0069330 | A1 * | 3/2005 | Kao et al. | 398/188 |
| 2005/0180470 | A1 * | 8/2005 | Sadot et al. | 372/20 |
| 2005/0260000 | A1 * | 11/2005 | Domagala | 398/188 |
| 2006/0147218 | A1 * | 7/2006 | Domagala | 398/155 |
| 2007/0047954 | A1 * | 3/2007 | Mamyshev | 398/33 |

FOREIGN PATENT DOCUMENTS

CN    1604504 A    4/2005

OTHER PUBLICATIONS

BER Evaluation for Phase and Polarization Diversity Optical Homodyne Receivers Using Non coherent ASK and DPSK Demodulation by J. Siuzdak and W. Van Etten © 1989).*

Yang Jing Wen, A. Nirmalathas and Dong-Soo Lee, "RZ/CSRZ-DPSK and Chirped NRZ Signal Generation Using a Single-Stage Dual-Electrode Mach-Zehnder Modulator", IEEE Photonics Technology Letters, Nov. 2004, pp. 2466-2468, vol. 16, No. 11.

(Continued)

*Primary Examiner*—Ken N Vanderpuye
*Assistant Examiner*—Hibret A Woldekidan
(74) *Attorney, Agent, or Firm*—Laurence A. Greenberg; Werner H. Stemer; Ralph E. Locher

(57) ABSTRACT

An optical differentially phase shift keyed or DPSK binary signal which in the event of phase changes exhibits amplitude reductions and is phase-demodulated is provided. The received optical DPSK binary signal is additionally amplitude-demodulated and resulting phase and amplitude information is evaluated.

9 Claims, 4 Drawing Sheets

OTHER PUBLICATIONS

Xiang Liu, Xing Wei, Yikai Su, Juerg Leuthold, Yuan-Hua Kao, Inuk Kang, and Randy C. Giles; "Transmission of an ASK-Labeled RZ-DPSK Signal and Label Erasure Using a Saturated SOA", IEEE Photonics Technology Letters, Jun. 2004, pp. 1594-1596, vol. 16, No. 6.

Jeffrey H. Sinsky, Andrew Adamiecki, Charles A. Burrus, S. Chandrasekhar, Juerg Leuthold and Oliver Wohlgemuth, "A 40-Gb/s Integrated Balanced Optical Front End and RZ-DPSK Performance", IEEE Photonics Technology Letters, Aug. 2003, pp. 1135-1137, vol. 15, No. 8.

* cited by examiner

METHOD AND ARRANGEMENT FOR DEMODULATING AN OPTICAL DPSK BINARY SIGNAL

CROSS REFERENCE TO RELATED APPLICATIONS

This application claims priority of German application No. 102005041368.4 DE filed Aug. 31, 2005, which is incorporated by reference herein in its entirety.

FIELD OF INVENTION

The invention relates to a method and an arrangement for demodulating an optical DPSK binary signal.

BACKGROUND OF INVENTION

There are different modulation methods for transmitting data. One possible modulation scheme, particularly in optical data transmission systems, is known as differential phase shift keying, or DPSK for short, whereby the information is encoded in the phase difference between two consecutive bits of a data signal. One possible implementation is to leave the phase of the subsequent bit the same if a logical "one" is to be transmitted and to change it by 180° if a logical "zero" is to be transmitted or vice versa.

To receive and convert the phase information into receiver-end amplitude information, i.e. to recover the data signal, in the receiver an interferometer, for example, is used at whose outputs the light of a transmitted bit is heterodyned with that of the subsequent bit. Normally employed for this purpose is a Mach-Zehnder arrangement wherein the path difference in the two branches or arms of said Mach-Zehnder arrangement corresponds to precisely one bit period. One output of this Mach-Zehnder arrangement or rather Mach-Zehnder interferometer emits light if the phase of the two interfering bits is identical. Another second output of the Mach-Zehnder arrangement has light if the phase is 180° shifted.

It is advantageous to use the information at both outputs of the Mach-Zehnder arrangement by connecting the two outputs to photodiodes and processing the signals of said photodiodes in a differential amplifier, thereby achieving in practice a sensitivity gain of just under 3 dB, i.e. for the same bit error rate a 3 dB lower optical signal-to-noise ratio OSNR is required. This is an advantage of DPSK modulation compared to other methods.

SUMMARY OF INVENTION

A known problem of phase modulation methods, particularly in optical transmission systems, is their sensitivity to interference caused by cross phase modulation, or XPM for short. If amplitude modulated channels are transmitted adjacently to the DPSK channels in the spectrum, these amplitude modulated channels cause a change in the phase of the DPSK channels due to cross phase modulation, i.e. the user information transmitted in these channels is affected. This can be so severe that error-free reception of the DPSK channel is not possible using the method outlined above. If amplitude modulated signals are spectrally adjacent, it would be inadvisable to use the DPSK modulation format in this case.

To minimize the effect of cross phase modulation, the usual practice has been to maintain a spectral distance between DPSK and amplitude modulated channels in an optical transmission system. This has reduced the capacity and therefore the efficiency of a transmission system.

An object of the present invention is to improve the demodulation of data signals, in particular of differentially phase modulated signals.

This object is achieved by a method and an arrangement set forth in the claims.

Differentially phase shift keyed or DPSK binary signals are frequently generated using a Mach-Zehnder modulator, or MZM for short, wherein the amplitude of the electrical control signal is selected such that the MZM is switched or rather "driven" from a first transmission maximum to a second transmission maximum, thereby producing the desired phase shift of 180° in the optical output signal. At the transition from one transmission maximum to the other, the transmission minimum lying between the two transmission maxima is also passed through, resulting in a reduction or rather a dip in the amplitude of the optical output signal, i.e. producing an amplitude dip at every phase change.

The advantage of the invention is that the receiver for demodulating the DPSK binary signal, which therefore determines phase information, additionally detects amplitude information also, i.e. detects the amplitude dip using an amplitude demodulator, and evaluates the phase and amplitude information. This evaluation can be performed by combining and/or jointly evaluating the phase and amplitude information or alternatively exclusively evaluating or using one of the two, e.g. the information with the lower bit error rate which is determined e.g. on the basis of the number of errors to be corrected by forward error correction, or FEC for short. By evaluating the amplitude information contained in the DPSK signal, which contains exactly the same information as the phase, as an amplitude dip occurs at each phase shift, redundancy information is available. As the amplitude is frequently less prone to interference due to cross phase modulation than the phase, improved modulation of the transmitted information as well as improved transmission can thus be achieved. By evaluating both phase and amplitude information in the optical DPSK binary signal, an increase in transmission robustness to interference, particularly cross phase modulation, can be achieved.

Advantageous embodiments of the invention are set forth in the dependent claims and in the exemplary embodiment.

BRIEF DESCRIPTION OF THE DRAWINGS

An example of the invention will now be explained in greater detail with reference to the accompanying drawings in which.

DETAILED DESCRIPTION OF INVENTION

Figure 1:
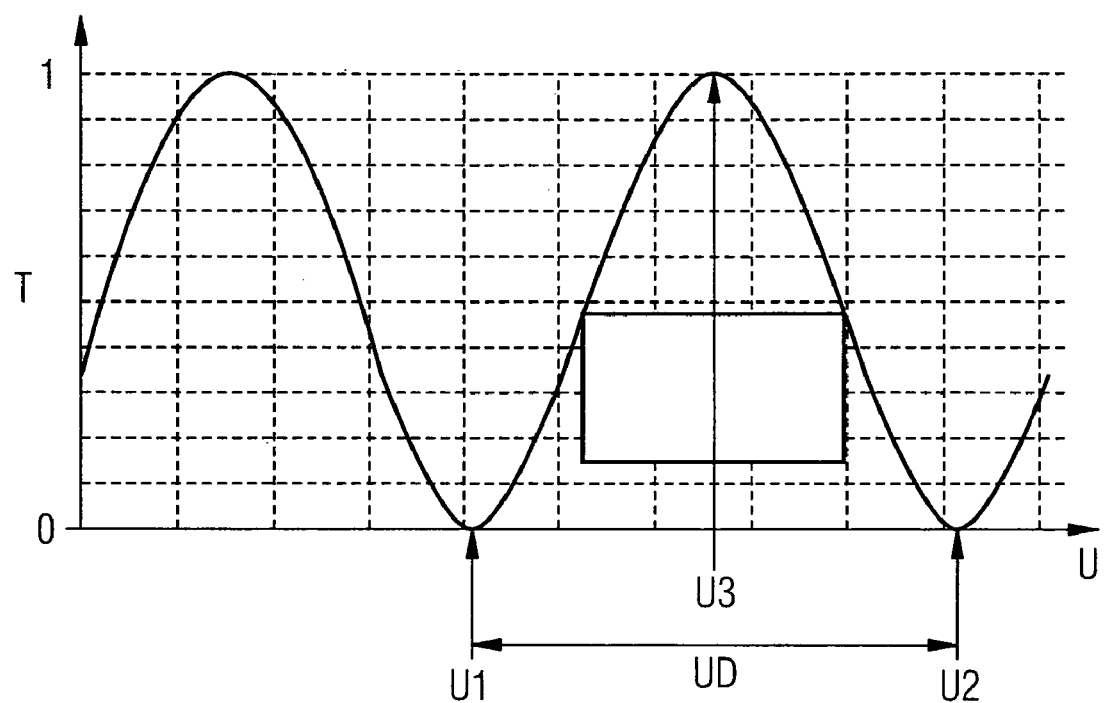
FIG. 1 shows a transmission characteristic of a Mach-Zehnder modulator.

FIG. 1 shows a plot of a transmission characteristic of a Mach-Zehnder modulator MZM. A voltage U is plotted on the horizontal axis and the transmission T on the vertical axis of the graph. The transmission T has a value range between the 0 and 1, i.e. at 0 there is no transmission and at 1 complete transmission of an optical signal passing through the Mach-Zehnder modulator MZM. A Mach-Zehnder modulator MZM has a sinusoidal transmission characteristic (periodic response) which is frequency-dependent. At a first voltage or rather a first voltage value U1 and at a second voltage or rather a second voltage value U2, transmission is maximal and attains the value 1 in the optimum case. At a third voltage U3, which is approximately in the middle or approximately midway between the first and second voltage U1, U2, transmission is minimal and attains the value 0 in the ideal case.

Figure 2:
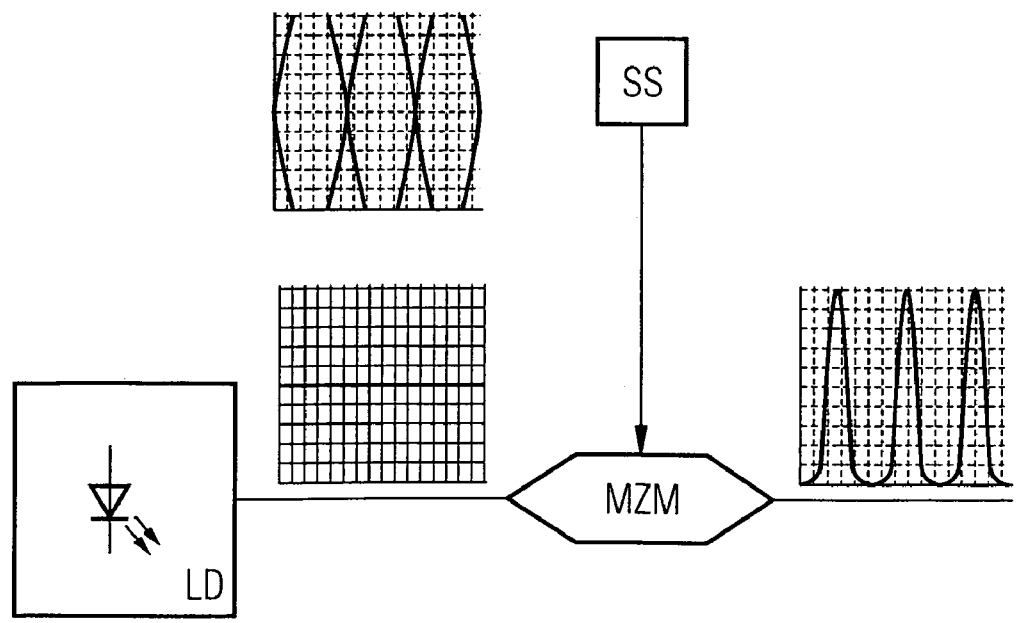
FIG. 2 shows an arrangement for generating a phase-modulated optical binary signal having amplitude reductions.

FIG. 2 shows an arrangement comprising an optical carrier signal source LD such as a laser diode, which produces an optical carrier signal. This is connected to a Mach-Zehnder modulator MZM so that the optical carrier signal is fed to the Mach-Zehnder modulator MZM. The electrical control input of the Mach-Zehnder modulator MZM is connected to a control circuit SS which can in turn be connected to a data signal source (not shown) for a data signal to be transmitted. At the output of the Mach-Zehnder modulator MZM there is generally connected a transmission link or device for transmitting an optical data signal (not shown).

A DPSK binary signal is characterized in that the information is contained in the phase difference or phase shift, i.e. at reception no absolute phases need to be determined, but only a phase difference. Each phase difference is assigned a first logical state, while the absence of a phase difference is assigned a second logical state.

An optical DPSK binary signal is generated by driving the Mach-Zehnder modulator MZM by an electrical control signal from the control circuit SS in such a way that a first optical binary signal level corresponding to a first logical state is produced by the first voltage value U1 or the second higher voltage value U2 of the control signal, the transmission characteristic exhibiting a transmission maximum at these voltage values. A second optical binary signal value corresponding to a second logical state is produced by a transition between the two voltage values so that a phase change in the optical signal is created, as the two transmission maxima produce optical signals of different phase. In addition, the transmission minimum of the transmission characteristic of the Mach-Zehnder modulator is passed through by the transition, thereby causing an amplitude change or rather an amplitude dip in the binary signal transmitted.

Figure 3:
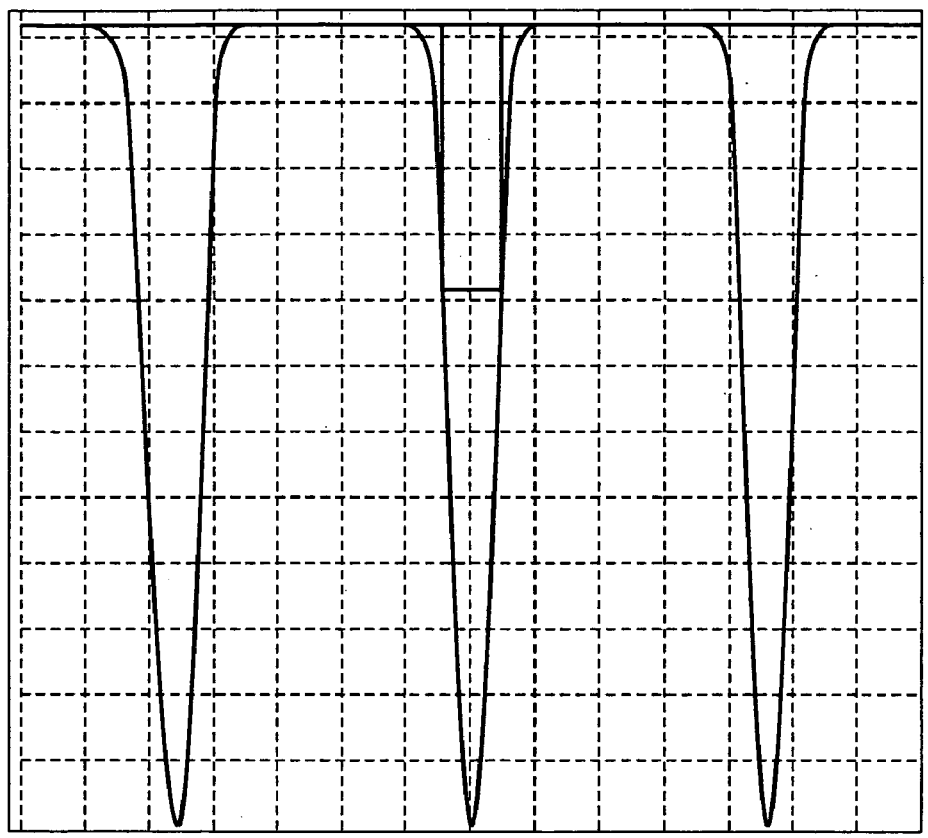
FIG. 3 shows a generated phase-modulated signal with amplitude reductions.

FIG. 3 shows amplitude dips in the optical phase-modulated binary signal which occur in the case of generation with a Mach-Zehnder modulator.

Figure 4:
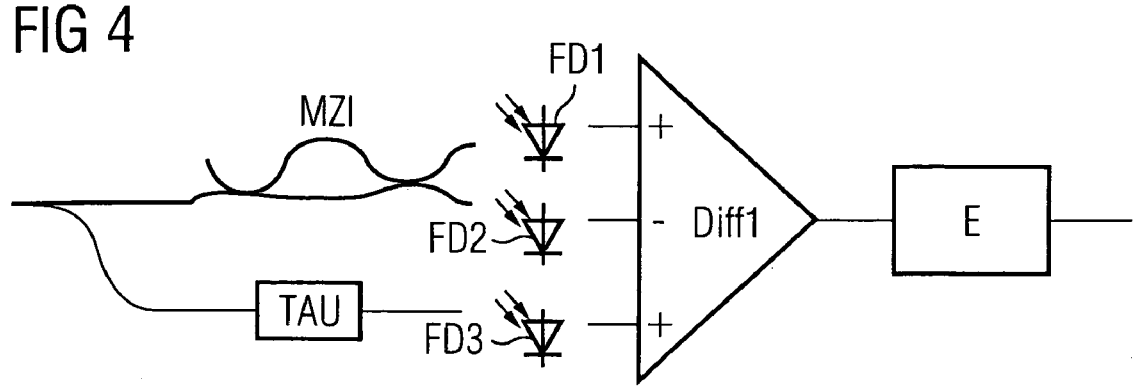
FIG. 4 shows a receiver according to the invention for a phase-modulated optical signal with amplitude reductions.

FIG. 4 shows an example of a receiver according to the invention, wherein the receive-end, phase-modulated input signal/DPSK binary signal, which has amplitude reductions or rather amplitude dips in the event of phase changes, is fed on the one hand to a phase demodulator comprising a Mach-Zehnder arrangement or more specifically a Mach-Zehnder interferometer MZI in which the path difference in the two arms corresponds to precisely one bit period. The output signals of the Mach-Zehnder interferometer MZI are fed to a first and second photodiode FD1, FD2, the noninverting output being connected to the first photodiode FD1 and the inverting output to the second photodiode FD2. The electrical signals of the first and second photodiodes FD1, FD2 are in turn fed to a differential amplifier Diff1, the first photodiode FD1 being connected to a positive input of the differential amplifier and the second photodiode FD2 to a negative input of the differential amplifier.

According to the invention, part of the phase-modulated input signal/DPSK binary signal is fed to an amplitude demodulator formed by a delay device TAU connected in series with a third photodiode FD3. Using the delay element TAU the amplitude dip is placed in the center of a bit lot in order thus to increase or reduce the amplitude of the output signal of the phase demodulator additively by the amplitude of the output signal of the amplitude demodulator. The delay device TAU can be implemented both optically and electrically here, i.e. the photodiode can be connected preceding or following. The electrical output signal of the amplitude demodulator is in turn fed to the differential amplifier Diff1, in this case another positive input of the differential amplifier Diff1. The differential amplifier Diff1 is followed by a discriminator E which can be implemented e.g. as a Schmitt trigger and generates an enhanced binary signal from the output signal of the differential amplifier Diff1.

By means of this arrangement both the phase information and the amplitude information is evaluated by the differential amplifier Diff1. In particular the electrical signals of the two demodulators are added time-coherently (using the delay element) via the positive input in order thus to achieve better detection of the transmitted information.

Figure 5:
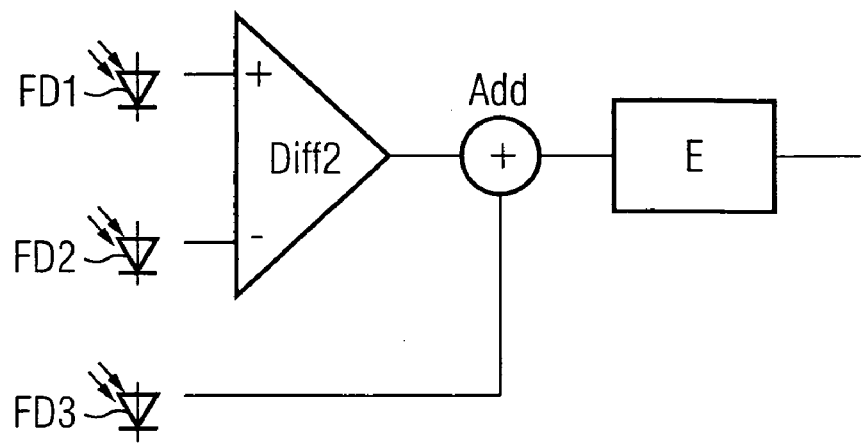
FIG. 5 shows another exemplary embodiment of a receiver according to the invention.

FIG. 5 shows an arrangement according to FIG. 4, with the difference that the amplitude-demodulated signal is added to the output signal of the differential amplifier.

Figure 6:
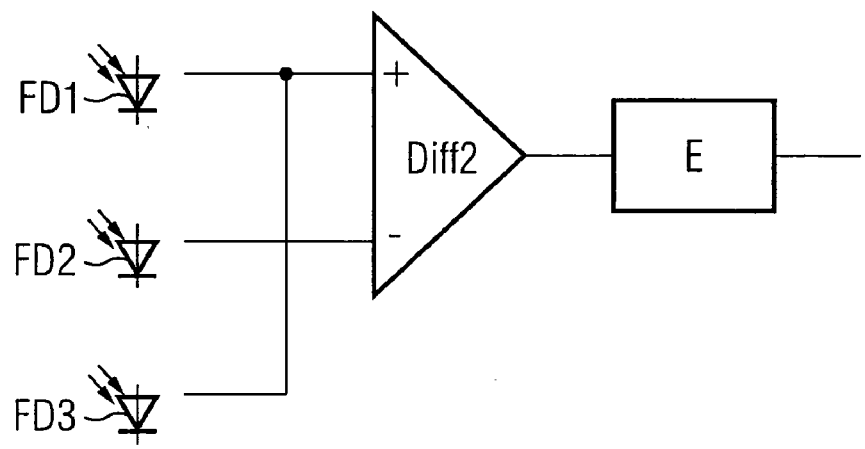
FIG. 6 shows another exemplary embodiment of a receiver according to the invention.

FIG. 6 shows another embodiment of the receiver according to the invention as shown in FIG. 4, with the difference that the amplitude-demodulated signal is added to the output signal of the first photodiode and fed to the positive input of the differential amplifier. When the DPSK binary signal is received with no phase change present, operation is as follows. In the absence of a phase change, a continuous signal or rather a continuous optical amplitude is produced at the noninverting output of the Mach-Zehnder interferometer. This is converted by the first photodiode into a continuous electrical signal.

A continuous signal is likewise produced by the amplitude demodulator or rather the third photodiode FD3. These two continuous electrical signals are added so that a signal with increased amplitude is fed to the positive input of the differential amplifier Diff1.

The inverting output of the Mach-Zehnder interferometer in this case supplies no output signal.

If the absence of a phase change of the DPSK binary signal is encoded with a logical one, this continuous state is fed out by the differential amplifier as a continuous signal or binary signal and evaluated by the discriminator which produces a corresponding binary sequence.

In the event of a phase change of the DPSK binary signal, two consecutive bits of the DPSK binary signal are heterodyned in the Mach-Zehnder interferometer. As these are phase shifted, they are cancelled out and no signal is produced at the noninverting output. Therefore no signal is fed to the positive input of the differential amplifier. As an amplitude dip occurs in the event of a phase change, a signal with amplitude dip is fed to the positive input of the differential amplifier.

In the event of a phase change, during the period of the bit the inverting input produces a signal which is fed to the negative input of the differential amplifier. This change of state between positive and negative signal is fed out accordingly at the output as a changed or second binary state. This state is then evaluated and identified by the discriminator so that a corresponding binary sequence is produced.

The gain is that there is fed to the positive input a higher-amplitude binary signal which has an amplitude dip analogous to the phase change in the event of a change of the output signal of the Mach-Zehnder interferometer.

Figure 7:
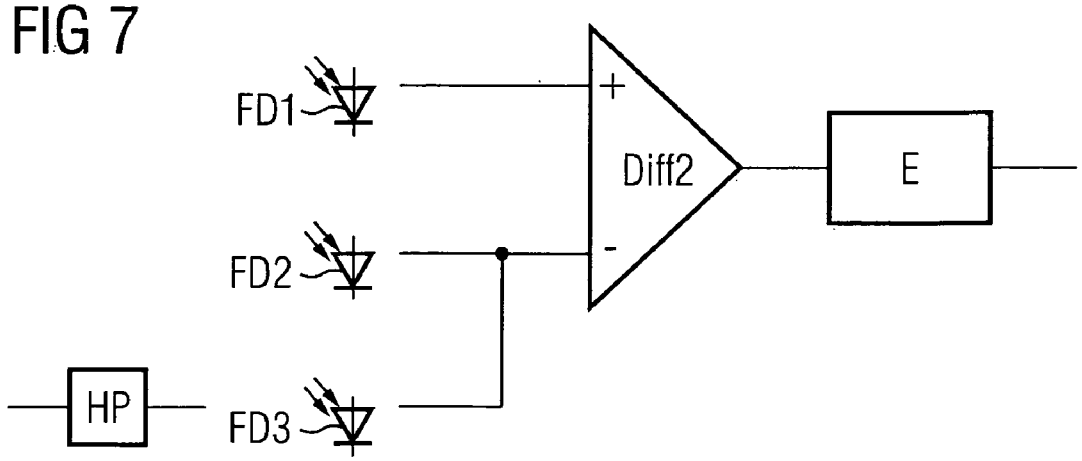
FIG. 7 shows another exemplary embodiment of a receiver according to the invention.

Alternatively, the signal to be amplitude-demodulated is high-pass filtered in the optical or electrical [lacuna], i.e. before or after optical/electrical conversion. Therefore the constant component is removed from the signal and only the amplitude dip is fed out as an amplitude peak. A corresponding arrangement is shown in FIG. 7. This is designed analogously to FIG. 6, with the difference that the high-pass filtered signal is fed to the negative input of the differential amplifier, and thus the amplitude of the phase demodulator is additively increased with the amplitude peak of the amplitude demodulator so that better detection of this state is possible with the discriminator. Here the amplitude peak should be delayed using the delay element TAU in such a way that the amplitude peak is constructively heterodyned with the output signal of the phase demodulator, i.e. occurs in the center of a bit or approximately in the center of a bit, thereby allowing better evaluation of the signal by the discriminator. The delay element can be disposed anywhere in the amplitude-demodulating branch.

Figure 9:
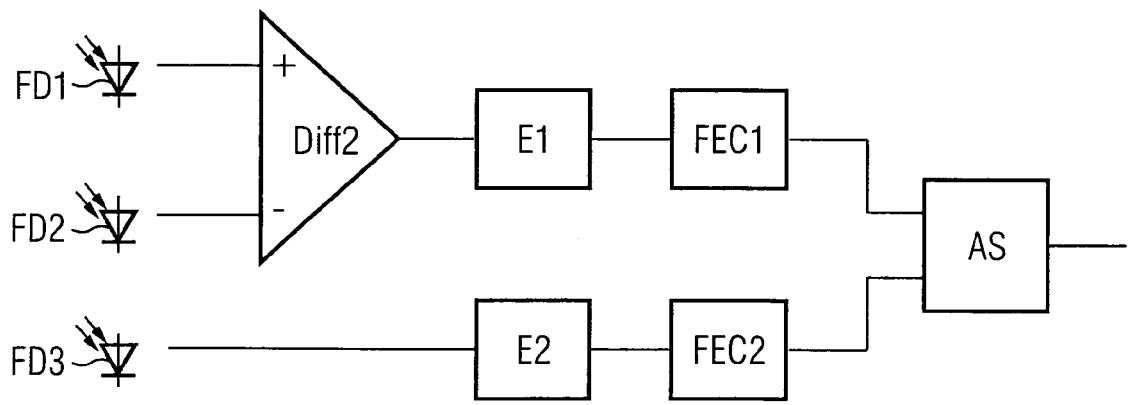
FIG. 9 shows another exemplary embodiment of a receiver according to the invention.

Alternatively, only the phase information or the amplitude information can be exclusively evaluated, e.g. by an interposed forward error correction decoding device which determines, on the basis of the number of errors to be corrected, the lowest bit error rate signal which is produced by a discriminator as an output signal. A forward error correction decoder can be connected after the phase demodulator and after the amplitude demodulator. An arrangement of this kind is shown in FIG. 9. The signal of the amplitude demodulator is fed to a second discriminator E2 which is followed by a second forward error correction device FEC 2. Analogously, the differential amplifier of the phase-demodulating branch is followed by a first discriminator E1 followed by a first forward error correction device FEC1. The outputs of the two FEC devices are connected to an evaluation circuit AS which produces the signal with the lower bit error rate at its output.

Figure 8:
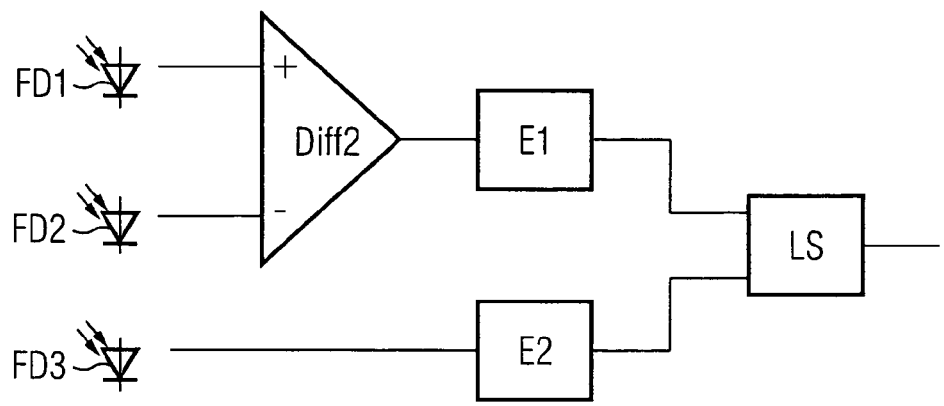
FIG. 8 shows another exemplary embodiment of a receiver according to the invention.

FIG. 8 shows an arrangement according to FIG. 9, with the difference that the outputs of the first and second discriminator E1, E2 are connected to a logic circuit LS which ORs or ANDs the two signals and feeds out the result as an output signal.

The differential amplifier can be implemented as an operational amplifier or operational amplifier circuit.

The invention claimed is:

1. A method for demodulating an optical differentially phase shift keyed (DPSK) binary signal which is phase modulated and in the event of phase changes exhibits amplitude reductions, said method comprising: receiving an optical DPSK binary signal; phase-demodulating the received optical DPSK binary signal; amplitude-demodulating said received optical DPSK binary signal; combining a phase-demodulated signal and an amplitude-demodulated signal to an output signal such that a resulting phase and amplitude information is evaluated; and evaluating the output signal, wherein in addition the amplitude-demodulated signal is combined with the phase-demodulated signal of a non-inverting output of the Mach-Zehnder interferometer and fed to a differential amplifier.

2. The method according to claim 1, wherein amplitude-demodulated signal is high pass filtered prior to combining.

3. A receiver for an optical differentially phase shift keyed (DPSK) binary signal having amplitude reductions during phase changes, comprising:
   a phase demodulator which phase-demodulates the received optical DPSK binary signal;
   an amplitude demodulator which amplitude-demodulates the received optical DPSK binary signal;
   a first device for combining both demodulated signals to an output signal such that a resulting phase and amplitude information is evaluated; and
   a second device for evaluating said output signal, wherein the phase demodulator is an interferometer that heterodynes a light of a transmitted bit with a light of a subsequent bit in each case and feeds out a first binary signal information at its output,
   the interferometer is a Mach-Zehnder arrangement, and
   an inverting and a non-inverting output of the Mach-Zehnder interferometer is connected in each case to an optical/electrical converter and to a differential amplifier that produces a first binary signal.

4. The receiver according to claim 3, wherein the differential amplifier is followed by a first discriminator that produces a second binary signal.

5. A receiver for an optical differentially phase shift keyed (DPSK) binary signal having amplitude reductions during phase changes, comprising:
   a phase demodulator which phase-demodulates the received optical DPSK binary signal;
   an amplitude demodulator which amplitude-demodulates the received optical DPSK binary signal;
   a first device for combining both demodulated signals to an output signal such that a resulting phase and amplitude information is evaluated; and
   a second device for evaluating said output signal, wherein the amplitude demodulator is preceded or followed by a delay element, and a series circuit comprising the delay element and amplitude demodulator is connected to the non-inverting input of the differential amplifier is connected to the electrical side of an optical/electrical converter that is connected to the non-inverting output of the Mach-Zehnder interferometer.

6. The receiver according to claim 5, wherein the amplitude demodulator or the delay element is preceded or followed by a high-pass filter.

7. The receiver according to claim 6, wherein a series circuit comprising the high-pass filter, delay element and amplitude demodulator is followed by a second discriminator producing a third binary signal.

8. The receiver according to claim 6, wherein a series circuit comprising the high-pass filter, delay element and amplitude demodulator is connected to the inverting input of the differential amplifier is connected to the electrical side of an optical/electrical converter that is connected to the inverting output of the Mach-Zehnder interferometer.

9. The receiver according to claim 5, wherein the output of the first discriminator and the output of the second discriminator are in each case connected to a first and a second forward error correction or FEC unit which determine a bit error rate in each case.

* * * * *